United States Patent [19]

Nitz

[11] 4,361,423
[45] Nov. 30, 1982

[54] COMBINATION ACOUSTICAL MUFFLER AND EXHAUST CONVERTER

[75] Inventor: Albert E. Nitz, Milwaukee, Wis.
[73] Assignee: NKN, Milwaukee, Wis.
[21] Appl. No.: 203,332
[22] Filed: Nov. 3, 1980
[51] Int. Cl.³ ............... B03C 1/08; B01D 50/00; F01N 7/02
[52] U.S. Cl. .................... 55/100; 55/276; 55/309; 55/319; 55/322; 55/323; 55/327; 55/329; 55/417; 55/485; 55/DIG. 21; 55/DIG. 30; 60/311; 181/231; 181/232; 181/250; 181/252; 181/258; 422/171; 422/176; 422/186
[58] Field of Search ............... 55/100, 276, 309, 316, 55/319, 321–323, 327, 329, 417, 485, 487, 523, 528, DIG. 21, DIG. 30, 418; 422/171, 176, 177, 186; 60/311; 181/231, 232, 250–253, 257, 258, 249, 255, 269, 272

[56] References Cited

U.S. PATENT DOCUMENTS

| | | | |
|---|---|---|---|
| 2,670,055 | 2/1954 | Dorman et al. | 55/276 |
| 3,154,389 | 10/1964 | Hayes et al. | 55/DIG. 30 |
| 3,326,198 | 6/1967 | Jackson et al. | 55/309 |
| 3,477,826 | 11/1969 | Moyer et al. | 55/276 |
| 3,521,429 | 7/1970 | Leffler | 55/276 |
| 3,530,649 | 9/1970 | Porsch et al. | 181/269 |
| 3,556,735 | 1/1971 | Epelman | 55/276 |
| 3,736,727 | 6/1973 | Shriner | 55/DIG. 30 |
| 3,762,135 | 10/1973 | Ikebe et al. | 55/100 |
| 3,802,163 | 4/1974 | Riojas | 55/276 |
| 4,149,862 | 4/1979 | Sewell, Sr. | 55/487 |
| 4,259,097 | 3/1981 | Patel et al. | 55/417 |
| 4,286,689 | 9/1981 | Malmsten | 181/232 |

FOREIGN PATENT DOCUMENTS

| | | | |
|---|---|---|---|
| 1218217 | 6/1966 | Fed. Rep. of Germany | 181/249 |
| 512982 | 2/1955 | Italy | 181/249 |
| 808806 | 2/1959 | United Kingdom | 55/276 |

Primary Examiner—David L. Lacey
Attorney, Agent, or Firm—Ira Milton Jones

[57] ABSTRACT

A combination acoustical muffler and exhaust converter for use with internal combustion engines, comprising an elongated hollow cylinder adapted to be connected to a source of exhaust gas, screen means positioned at a plurality of longitudinally spaced locations within said cylinder for partitioning the cylinder into a plurality of chambers arranged in series flow relation with each other and with respect to the flow of exhaust gas through said cylinder, the screens having a silencing action on said exhaust gas, magnet means in one of said chambers for exerting a magnetic pressure on the gas passing therethrough to serve to separate ferrous particles from the exhaust gas stream, a packing material of mineral material, such as mineral wool, in another of said chambers for condensing moisture in said exhaust gas and for removing hydrocarbon therefrom, and a material such as a ceramic material of an extremely fine porous nature, in still another of said chambers for removing carbon monoxide from said exhaust gas.

11 Claims, 5 Drawing Figures

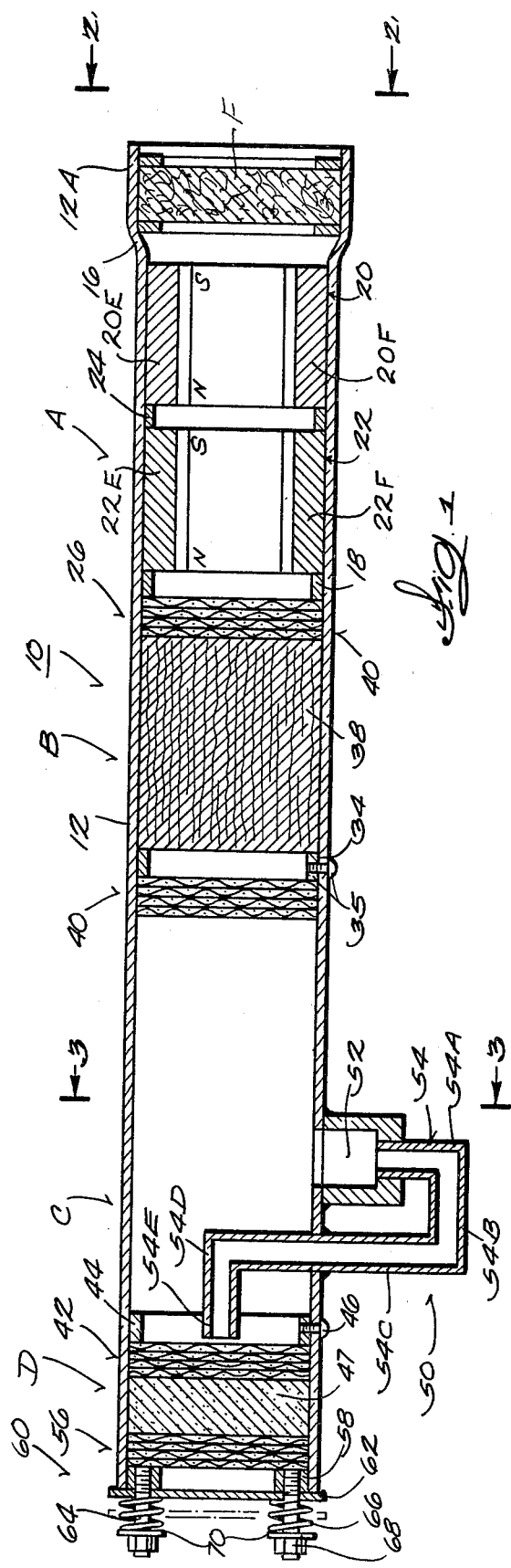
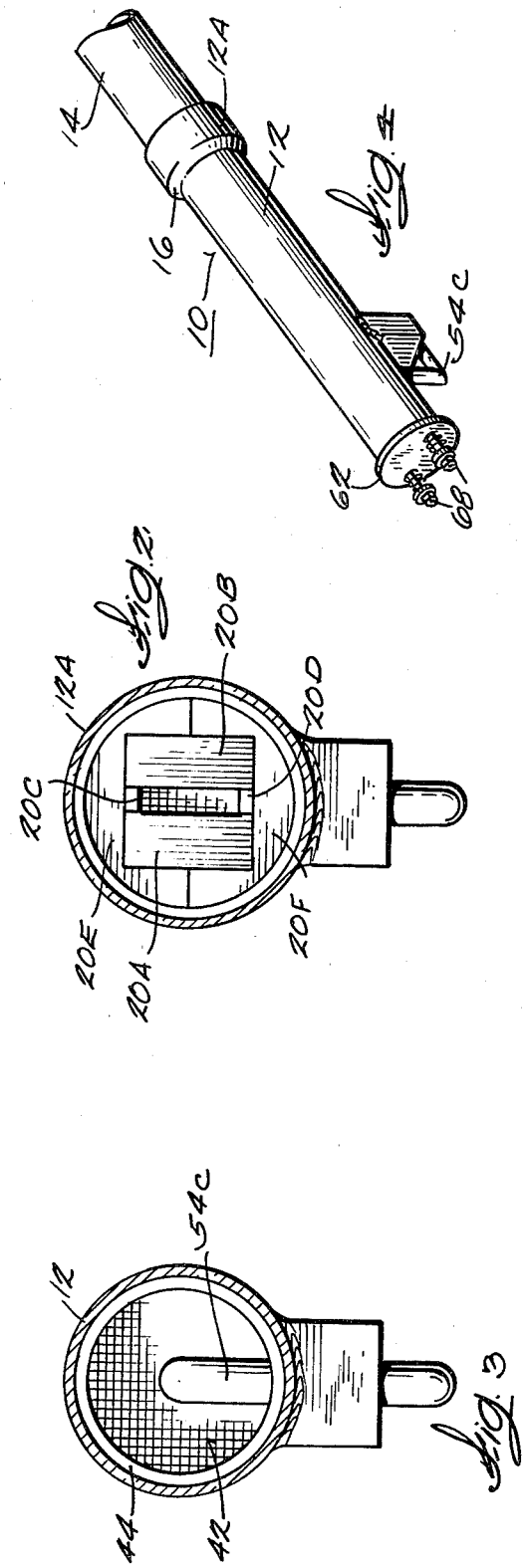

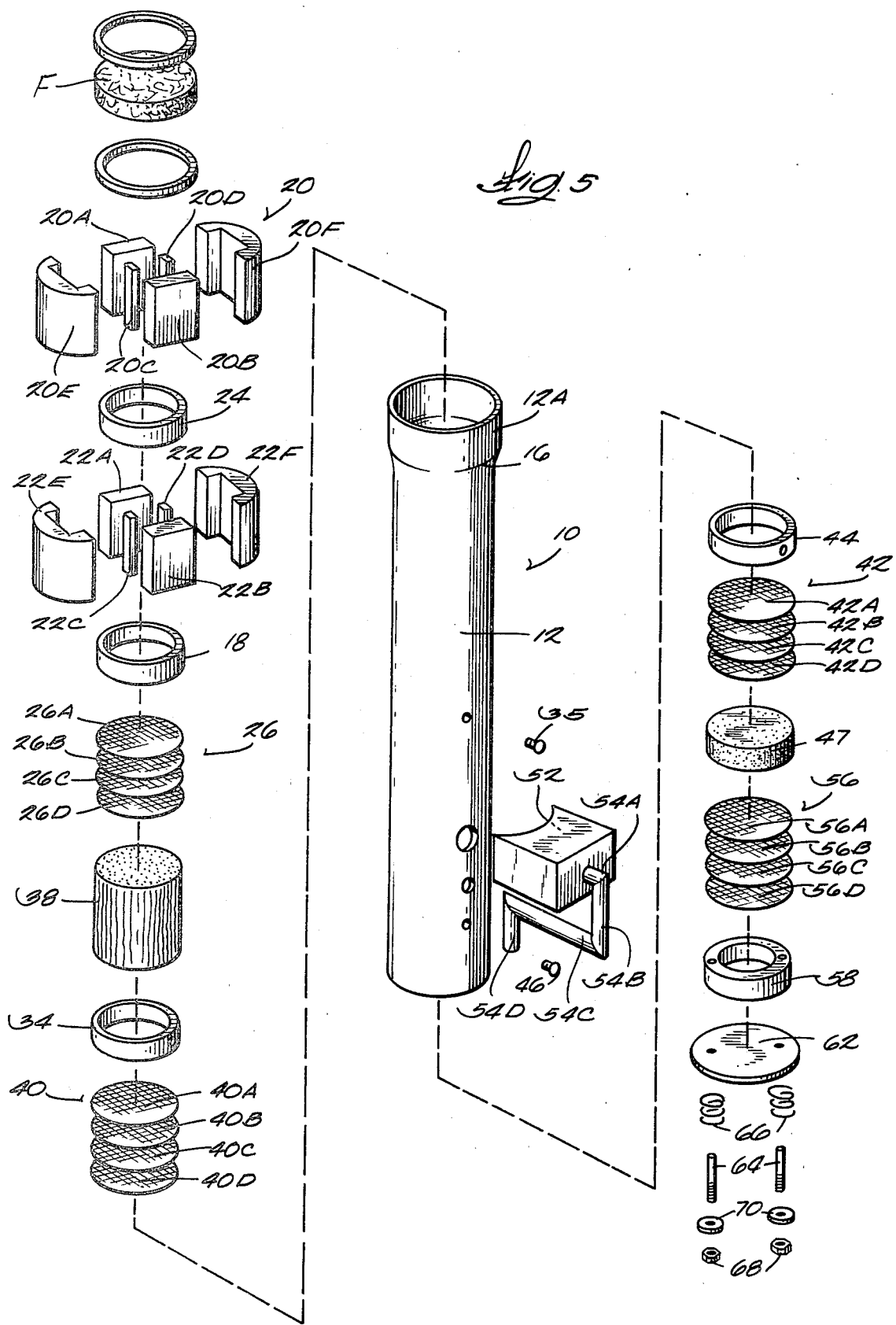

COMBINATION ACOUSTICAL MUFFLER AND EXHAUST CONVERTER

FIELD OF THE INVENTION

This invention relates to mufflers, such as those generally used in connection with internal combustion engines for reducing the noise of the engine exhaust, and, more particularly, to a combined acoustical muffler and exhaust converter which is capable not only of silencing the exhaust gases but also of purifying the exhaust gases passing through the muffler and of converting such exhaust gases into discharge products which are environmentally unobjectionable.

DESCRIPTION OF THE PRIOR ART

It is broadly known in the prior art to provide acoustical mufflers for reducing the noise of the internal engine exhaust gases and to combine with such mufflers constructional features or other suitable means which aid in converting the exhaust gases passing through the muffler into discharge products which are environmentally unobjectionable. Examples of prior art patents showing combination mufflers and exhaust converters include the following:

U.S. Pat. No. 3,154,389 issued to W. B. Hayes III et al on Oct. 27, 1964

U.S. Pat. No. 3,477,826 issued to R. H. Moyer et al on Nov. 11, 1969

U.S. Pat. No. 3,556,735 issued to J. Epelman on Jan. 19, 1971

STATEMENT OF THE INVENTION

It is an object of the present invention to provide a combined acoustical muffler and exhaust converter which combines in a single structure a muffler which silences the noises associated with the exhaust gases of an internal combustion engine and reduces their temperature, and which also includes structural features and/or means for converting the deleterious combustion products of the exhaust gases into environmentally harmless or objectionable exhaust discharge products.

It is a further object of the invention to provide a combined acoustical muffler and exhaust converter for use in silencing and treating the exhaust gases discharged by an internal combustion engine, which combination muffler and exhaust converter represents an improvement over prior art arrangements for silencing and converting the exhaust gases of an internal combustion engine.

BRIEF DESCRIPTION OF THE DRAWINGS

Further objects and advantages of the invention will become apparent from the following description, taken in conjunction with the accompanying drawings, in which:

FIG. 1 is a view in longitudinal section of the combination muffler and exhaust converter in accordance with the invention;

FIG. 2 is an end view taken along line 2—2 of FIG. 1;

FIG. 3 is a view in transverse section, taken along section line 3—3 of FIG. 1;

FIG. 4 is a perspective view of the combination muffler and exhaust converter of FIG. 1, showing the combination muffler and exhaust converter connected to the tailpipe of an internal combustion engine; and FIG. 5 is an exploded view showing the combination muffler and exhaust converter together with all of the various elements which are received in and form a part of the combination muffler and exhaust converter.

In achievement of these objectives, there is provided in accordance with the invention a combination acoustical muffler and exhaust converter for use with internal combustion engines, comprising an elongated hollow cylinder adapted to be connected to a source of exhaust gas, screen means positioned at a plurality of longitudinally spaced locations within said cylinder for partitioning the cylinder into a plurality of chambers arranged in series flow relation with each other and with respect to the flow of exhaust gas through said cylinder, the screens having a silencing action on said exhaust gas, magnet means in one of said chambers for effecting homogenization of the gases and for separating ferrous particles from the exhaust gas stream, a packing material in another of said chambers for condensing said exhaust gas and for removing hydrocarbon therefrom, and a material in still another of said chambers for removing carbon monoxide from said exhaust gas.

DESCRIPTION OF THE PREFERRED EMBODIMENT

Referring now to the drawings, the combination acoustical muffler and exhaust converter is generally indicated at 10 and comprises an elongated hollow tubular member, generally indicated at 12, which includes at its right-hand end—with respect to the view shown in FIG. 1—an enlarged diameter portion 12A which is suitably connected, preferably to the outlet end of the exhaust tailpipe 14 of an internal combustion engine (not shown). The interior of the elongated cylinder 12 is divided into four chambers, respectively designated at A, B, C and D, these chambers being defined by partitioning or separating means hereinafter described. A filter screen of stainless steel wool or a wire mesh F may be located at the inlet of the muffler to remove any foreign particles that may be present in the exhaust gas.

The first chamber A of cylinder 12 is bounded at the right-hand end thereof with respect to the view shown in FIG. 1, by the junction 16 between cylinder 12 and the enlarged diameter portion 12A thereof which receives tailpipe 14. The left-hand end of chamber A relative to the view of FIG. 1, is bounded by hollow cylindrical spacer member 18 and by the upstream side of a screen subassembly 26 which will be more fully described hereinafter.

Positioned within chamber A are a first and a second set of permanent bar magnets, respectively indicated at 20 and 22, in longitudinally spaced relation to each other relative to the longitudinal axis of cylinder 12. The first set of magnets 20 includes first and second permanent magnets 20A and 20B of generally rectangular shape. The two magnets 20A and 20B extend parallel to each other longitudinally of cylinder 12. The north and south poles of each of the respective permanent magnets 20A and 20B are located at the opposite longitudinal ends of each respective magnet 20A and 20B. The two magnets 20A and 20B are spaced apart laterally from each other within the interior of cylinder 12 and are maintained in substantially closely laterally spaced relation by two non-magnetic spacers, indicated at 20C and 20D.

Corresponding ends of the two magnets 20A, 20B have the same polarity. Arcuate spacer members 20E and 20F of non-magnetic material are positioned between the upper and lower ends of the two magnets 20A, 20B and the inner surface of cylinder 12, to maintain the magnets properly positioned within cylinder 12. The arcuate spacers extend for the entire length of magnets 20A, 20B and in bridging relation to the two magnets 20A, 20B.

A spacer member of hollow cylindrical shape, indicated at 24, is positioned between the first and second sets 20 and 22, respectively, of permanent magnets.

The second set of permanent magnets, generally indicated at 22, is similar to the first set of permanent magnets 20 just described, and includes two rectangular-shaped permanent magnet members, indicated at 22A and 22B, each respectively having their north and south poles at the opposite longitudinal ends of the respective rectangular permanent magnets 22A and 22B. The two magnets 22A and 22B are maintained in laterally spaced relation to each other by two spacer members 22C and 22D of non-magnetic material. Also, arcuate spacer members 22E and 22F, similar to the arcuate spacer members 20E and 20F described in connection with magnets 20A, 20B are used to maintain magnets 22A, 22B properly positioned within cylinder 12.

The magnets of each set are disposed with their opposing flat faces at opposite sides of and parallel to the cylinder axis, and their faces define walls which cooperate with portions of the spacers 20E, 20F, 22E and 22F to provide narrow gas passages that are coaxial with the cylinder but of far less cross sectional area than those portions of the cylinder which lie at axially opposite sides of each set of magnets.

The chamber B is positioned immediately downstream of the magnet-containing chamber A, and is bounded at its right-hand end with respect to the view of FIG. 1, by the downstream side of a filter means or screen subassembly 26, and at its left-hand end with respect to the view of FIG. 1 by the hollow annular spacer 34 and by the upstream side of screen subassembly 40. Annular spacer ring 34 is secured in a fixed position relative to cylinder 12 by a screw 35 which passes through cylinder 12 and through the rim of spacer ring 34. Screen subassembly 26 defines a partition between chambers A and B and comprises a plurality of screens of different mesh size, specifically indicated at 26A, 26B, 26C and 26D, positioned in axially abutting relation to each other and to the left-hand or downstream end of hollow annular spacer ring 18 with respect to the view shown in FIG. 1.

The hollow interior of chamber B between the filter means or screen subassemblies 26 and 40, is filled with a mineral material such as a mineral wool 38, the fibers of which are arranged in substantially parallel relation to each other and to the longitudinal axis of hollow cylinder 12, to permit passage of the exhaust gases therethrough. Due to the arrangement of the fibers of the mineral wool parallel to the longitudinal axis of cylinder 12, the exhaust gases flow through chamber B in flow paths which are also parallel to the longitudinal axis of the cylinder.

The hollow chamber C which is immediately downstream of chamber B with respect to the direction of flow of the exhaust gases, is bounded at its right-hand end with respect to the view in FIG. 1, by the downstream face of the filter means or screen subassembly, generally indicated at 40, which comprises a plurality of individual screens of different mesh size, specifically indicated at 40A, 40B, 40C and 40D.

Chamber C is bounded at its left-hand end relative to the view in FIG. 1 by the right-hand or upstream face of a filter means or screen subassembly, generally indicated at 42, which abuts against a hollow annular spacer ring 44 secured in a fixed axial position relative to cylinder 12 by a screw 46 which passes through the wall of cylinder 12 and through the rim of annular spacer ring 44. Screen subassembly 42 comprises a plurality of abutting screens of different meshes, indicated at 42A, 42B, 42C and 42D.

The bypass generally indicated at 50, is provided in conjunction with the chamber C and comprises a discharge or bypass port 52 which communicates with the interior of chamber C intermediate its length. Port 52 is connected to a bypass conduit 54 which comprises a relatively short radially outwardly directed conduit portion 54A, an axially extending conduit portion 54B, a radially inwardly extending conduit portion 54C, and an axial conduit portion 54D which lies along the central longitudinal axis of cylinder 12 and of chamber C. Portion 54D of bypass conduit 54 terminates in an outlet orifice 54E which discharges the bypassed portion of the exhaust gases with a jet-like effect contiguous the upstream face of the filter means or screen subassembly 42 which bounds chamber D.

Chamber D is bounded at its upstream or right-hand end relative to the view of FIG. 1, by the screen assembly 42 and at its downstream or left-hand end relative to the view of FIG. 1 by a screen subassembly 56. The screen subassembly 42 at the upstream end of chamber D comprises a plurality of abutting screens of different meshes, respectively indicated at 42A, 42B, 42C and 42D. In a similar manner, screen subassembly 56 comprises a plurality of abutting screens of different mesh, respectively indicated at 56A, 56B, 56C and 56D. The downstream or left-hand end of screen subassembly 56 relative to the view shown in FIG. 1, abuts against a hollow annular spacer ring 58.

The chamber D defined between the two screen subassemblies 42 and 56, is filled with an extremely fine porous material 48, such as a ceramic.

The outlet end of the combination muffler and exhaust converter assembly may be normally closed by a one-way valve subassembly, generally indicated at 60, comprising a plate member 62 which is slideably mounted on pin or stud members 64, which threadedly engage threaded passages in hollow annular spacer ring member 58. Valve plate 62 is biased toward closed position by weak spring members 66 which are coaxially positioned around the screw members 64 and bear against the left-hand end relative to the view of FIG. 1 of valve plate 62. A washer 70 is slidably received on each stud 64 axially outwardly of the corresponding spring 66 and nut members 68 threadedly engage the axially outer ends of stud or pin members 64 and serve to confine springs 66 between washer members 70 and the axially outer surface of valve plate 62.

In the operation of the combination muffler and exhaust converter hereinbefore described and shown in the drawings, the exhaust gases enter the upstream or right-hand end of cylinder 12 from the exhaust pipe 14 of the internal combustion engine. Exhaust gases first pass through the filter F and then through the passages between the permanent magnet subassemblies 20 and 22 which effect their homogenization and remove any ferrous particles therefrom. The arrangement of the permanent magnet subassemblies 20 and 22 of the spacer members 20C, 20D, 20E and 20F relative to permanent magnet subassembly 20, and of spacer members 22C, 22D, 22E and 22F relative to the second permanent magnet subassembly 22 provides ample clearance space for the exhaust gases to pass into proximity and into contact with the permanent magnet subassemblies, but at the same time provides space for the gases to pass beyond and in substantially unimpeded flow relation through cylinder 12.

The exhaust gases pass from the magnet-containing chamber A into and through screen subassembly 26 and into chamber B which contains the mineral 38, having its fibers arranged substantially parallel to the longitudinal axis of hollow cylinder 12, whereby to cause the gas to flow in parallel paths through chamber B. The mineral 38 in chamber B tends to condense water moisture present in the exhaust gases and also provides a cleaning effect on the exhaust gases as they pass therethrough by removing hydrocarbons from the exhaust gas.

Also, the screen subassemblies 26 and 40 which respectively bound the upstream and downstream ends of chamber B, tend to remove particulate matter suspended in the exhaust gases and have a silencing or muffling effect on the exhaust gases as they pass from chamber A into chamber B and from chamber B into chamber C. Screen subassemblies 42 and 56 also have a silencing effect on the exhaust gases.

Chamber C serves as a silencing chamber to further aid in silencing the noises of the exhaust gases. Also, a portion of the exhaust gases pass laterally outwardly from chamber C through port 52 and through bypass conduit 54 connected to port 52, the bypass gases exiting from the outlet orifice 54E of bypass conduit 54 in a jet stream impinging against the upstream face of screen subassembly 42. The bypass gases which are emitted in jet-like fashion from discharge orifice 54E of bypass conduit 54, together with the other exhaust gases in chamber C which were not bypassed through the bypass arrangement 50, pass through the screen subassembly 42 and enter chamber D. The gases entering chamber D pass through the extremely fine porous ceramic material 47 which fills chamber D. The exhaust gas, in passing through the fine, porous ceramic material 47, is further cleaned and has the carbon monoxide (CO) removed therefrom by the ceramic material, the exhaust gas thence passing outwardly through the one-way valve subassembly 60. The pressure of the exhaust gas at the downstream end of the assembly 10 causes valve plate 62 to open against the force of springs 66 to discharge the purified and silenced exhaust gas through the one-way valve assembly provided by valve plate 62 and by the cooperating biasing springs 66.

The use of the spring biased one-way valve subassembly 60 insures that noxious fluids will not escape from the combination muffler and exhaust assembly when the internal engine to which the assembly is connected is not operating. For any exhaust gases to escape through the one-way valve assembly 60 requires that there be sufficient pressure to force the valve plate 62 open against the force of biasing springs 66; however, if the internal combustion engine is not operating, the valve plate 62 will remain closed to prevent leakage or exhaust of any noxious fluids from the downstream end of cylinder 12.

From the foregoing detailed description of the invention, it has been shown how the objects of the invention have been obtained in a preferred manner. However, modifications and equivalents of the disclosed concepts such as readily occur to those skilled in the art, are intended to be included within the scope of this invention.

The invention is defined by the following claims:

I claim:

1. A combination acoustical muffler and exhaust converter for use with internal combustion engines, comprising:
  A. an elongated hollow cylinder having an inlet end to receive exhaust gas, and having an outlet end;
  B. sets of filtering means positioned at a plurality of longitudinally spaced locations within the cylinder for filtering exhaust gas flowing therethrough and for partitioning the cylinder into a number of chambers arranged in series flow relation with one another, said filtering means being arranged and constructed to have a silencing action on the gas flowing through the cylinder without interfering with substantially straight axial gas flow therethrough, and each such set of filtering means comprising
    (1) a number of screen discs of different size mesh extending across the interior of the cylinder,
    (2) and the screen discs of each set of filtering means being arranged in a stack in contiguous relation to one another;
  C. packing material means in one of said chambers for condensing moisture in the exhaust gas and for removing hydrocarbon therefrom, said packing material means being comprised of fibers all disposed longitudinally of the cylinder;
  D. and means confined between two adjacent sets of screen discs which define a second one of said chambers, for removing carbon monoxide from the exhaust gas, said last named means extending completely across the interior of the cylinder.

2. A combination acoustical muffler and exhaust converter as defined in claim 1, comprising
  a one-way valve at the outlet end of said cylinder, and
  means lightly biasing said one-way valve to normally closed position, whereby said valve opens only when the exhaust gas at said outlet end has a predetermined pressure.

3. A combination acoustical muffler and exhaust converter as set forth in claim 1, in which said carbon monoxide removal means comprises a porous ceramic material.

4. A combination acoustical muffler and exhaust converter as set forth in claim 1, further comprising:
  E. a pair of permanent bar magnets in a third one of said chambers;
  F. said third chamber being located nearest to the inlet end of the cylinder;
  G. and nonmagnetic means mounting said magnets in said third one of said chambers in substantially closely spaced relation transversely of the cylinder, and cooperating with the magnets to define a narrow gas passage coaxial with the cylinder and bounded mainly by opposing surfaces of said magnets.

5. A combination acoustical muffler and exhaust converter as set forth in claim 4,
  wherein said nonmagnetic means mounts the magnets in a portion of said third chamber located intermediate substantially unrestricted portions thereof.

6. A combination acoustical muffler and exhaust converter as set forth in claim 5, further comprising:

a second pair of said magnets and mounting means therefor arranged in series flow relation in said third chamber, said second pair of magnets and mounting means being also located axially between substantially unrestricted portions of said third chamber.

7. A muffler for use with internal combustion engines, comprising:
   A. an elongated tubular member having an inlet for exhaust gas at one end and an outlet at its other end;
   B. filtering means positioned at a plurality of longitudinally spaced locations within said member for partitioning the same into four chambers arranged in series flow relation with respect to each other, said filtering means having a silencing action on the exhaust gas;
   C. means in the first entered chamber defining a narrow gas passage coaxially of said member, a said means comprising a pair of bar magnets having opposing flat faces defining opposite sides of said passage, said magnets being operable to separate particles of ferrous material from exhaust gas flowing through said passage;
   D. a packing material means in the second entered chamber for condensing moisture out of exhaust gas and for removing carbon therefrom as it passes through the second entered chamber;
   E. the third entered chamber being substantially unrestricted;
   F. and a substantially fine porous ceramic material filling the fourth entered chamber.

8. The muffler of claim 7, further characterized by a second narrow gas passage in said first entered chamber, downstream of and coaxial with the first such narrow passage, and defined by means comprising a second pair of said bar magnets located in axially spaced relation to said first designated pair of magnets.

9. The muffler of claim 8, further including a second such pair of magnets and mounting means therefor in said inlet chamber, in spaced relation to the downstream end thereof and to said first designated prior of magnets.

10. A muffler for use with internal combustion engines, comprising:
    A. an elongated tubular member having an inlet at one end and an outlet at its other end;
    B. means in said member defining an inlet chamber to initially receive exhaust gas entering the muffler;
    C. means in an upstream portion of said chamber constraining all gas entering the latter to flow through a substantially narrow longitudinally disposed central passage, said means comprising
       (1) a pair of permanent bar magnets in said chamber with one flat side of each substantially closely opposing one flat side of the other;
    D. and silencing means mounted within said member at a plurality of longitudinally spaced locations downstream of said inlet chamber.

11. A combination acoustical muffler and exhaust converter for use with internal combustion engines, comprising:
    A. an elongated tube having inlet and outlet ends;
    B. a number of filtering units mounted in the tube at longitudinally spaced locations, said filtering units being constructed and arranged to have a silencing action on the gas flowing through the tube without interfering with substantially straight axial gas flow therethrough;
    C. packing material means mounted in the tube between two adjacent filtering units, for removing hydrocarbons from the gases flowing through the tube, said packing material means being comprised of fibers all oriented substantially longitudinally of the tube;
    D. means confined in the inlet end portion of the tube between two adjacent filtering units which are at the upstream side of said packing material means, defining a narrow gas passage which is coaxial with the tube and which has flat opposing walls disposed at opposite sides of the tube axis, through which narrow passage all gases entering the tube are compelled to flow;
    E. and means extending completely across the interior of the tube near its outlet end for removing carbon monoxide from the exhaust gases passing through the tube.

* * * * *